Feb. 19, 1924.
C. A. BRINK
1,484,467
CLUTCH DEVICE
Filed Dec. 19, 1921
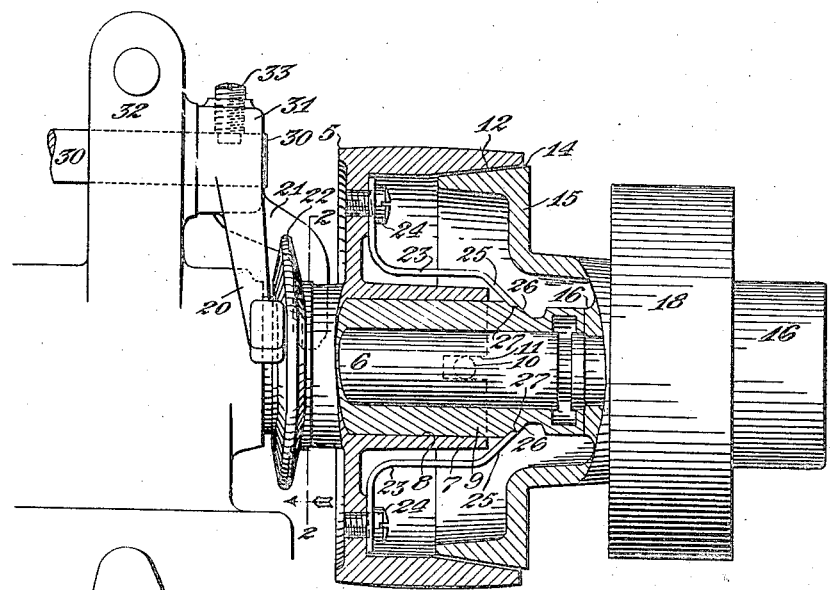
Fig.1.
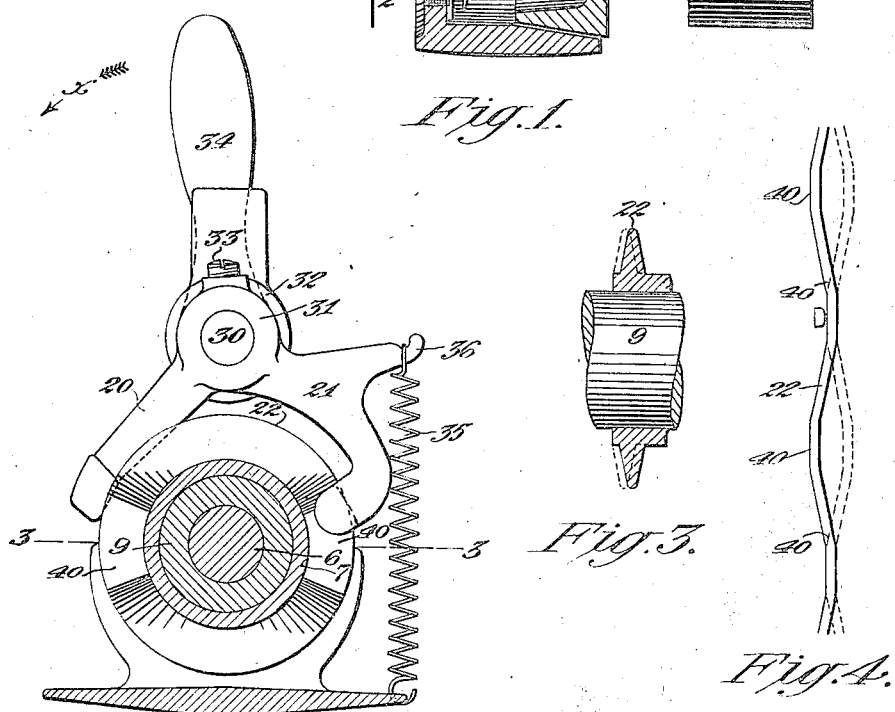
Fig.2.
Fig.3.
Fig.4.
Inventor:
Carl A. Brink,
By Watson, Coit, Morse & Grindle,
Attorneys.

Patented Feb. 19, 1924.

1,484,467

UNITED STATES PATENT OFFICE.

CARL A. BRINK, OF CRANSTON, RHODE ISLAND, ASSIGNOR, BY MESNE ASSIGNMENTS, TO THE NEW ENGLAND TRUST COMPANY, TRUSTEE, A CORPORATION OF MASSACHUSETTS.

CLUTCH DEVICE.

Application filed December 19, 1921. Serial No. 523,552.

*To all whom it may concern:*

Be it known that I, CARL A. BRINK, a citizen of the United States, residing at Cranston, in the county of Providence, State of Rhode Island, have invented certain new and useful Improvements in Clutch Devices, of which the following is a specification.

My invention relates to improvements in clutch-devices for controlling the driving connection between two or more machine elements.

One object of the improvement is to provide means for effecting the engagement and release of the clutch-members with a smooth easy action while reducing the wear on the operating parts.

Another object of the improvement is to insure a quicker and more positive engagement and release of the clutch-members without drag or sluggishness in the action thereof.

Further objects of the improvement are set forth in the following specification which describes a preferred embodiment of the invention as illustrated by the accompanying drawings. In the drawings:

Fig. 1 is a side elevation of my improved clutch-device showing the clutch-members in section on a vertical plane taken through their axis of rotation;

Fig. 2, an end view of a portion of the device, shown in part section on the line 2—2 of Fig. 1 to more clearly illustrate the clutch-controlling levers;

Fig. 3, a sectional view of the clutch-member flange, with which the controlling-levers cooperate, taken on the line 3—3 of Fig. 2; and Fig. 4, a more or less diagrammatic view showing a development of the rim of the flange and illustrating it in two different positions to show its relation to the controlling-lever.

Referring first to Fig. 1 of the drawings, I have preferred to herein describe and illustrate my improvement as applied to use with a clutch-mechanism comprising two rotating elements, a driving-member and a driven-member. Either or both of said elements may take the form of a wheel, pulley, gear or other transmission-member and as here shown the shiftable clutch-member is constructed as a belt-pulley 5 mounted free to rotate about the axis of a shaft or spindle 6. Preferably, the pulley 5 is provided with a hub 7 having an enlarged bore 8 fitted to a sleeve or bushing 9 surrounding the shaft 6. In the present arrangement the hub 7 of the pulley 5 is adapted to slide on the sleeve 9, but is held rotatively therewith by means of a pin 10 in the sleeve which engages a slot 11 in the hub; the sleeve itself being free to turn on the shaft 6 and providing an extended bearing for the pulley. The outer rim of the pulley 5 overhangs the hub 7 and is formed with an interior, tapered clutch-face 12 adapted to engage with the oppositely tapered clutch-face 14 of a fixed clutch-member 15. This latter element is here shown as provided with an offset hub 16 which is secured fast on the reduced end of the shaft 6 by means of any usual arrangement, such as a key or set-screw, not herein illustrated. The member 15 may be employed as the driven element to communicate rotation to the shaft 6, or it may constitute the driving element for transmitting motion to the pulley 5; such modifications in the manner of applying and transmitting power through the clutch-members being within the spirit and scope of the present invention.

In the particular type of apparatus herein shown the clutch-device is adapted for use particularly on winding machines, the shaft 6 constituting the winding-spindle and the belt-pulley 5 the driver therefor; while the clutch-member 15 is provided with an expansible pulley 18 which is connected by a belt to drive the cam-shaft of the winder, not herein shown. A somewhat similar arrangement of these elements is shown and described in United States Letters Patent No. 834,778, granted October 30, 1906, to Simon W. Wardwell. As in the device of this prior patent, the pulley 5 is arranged to slide axially of the shaft 6 to adapt it to engage with the fixed clutch-member 15, and suitable controlling-levers 20 and 21 are employed for shifting the pulley into and out of engagement with said member. The levers 20 and 21 engage with a beveled flange 22 on the hub of the pulley 5 and their action is mainly to initiate the sliding movement of the pulley 5 in one direction or the other; a pair of spring-arms 23 being employed to continue the movement of the pulley in the manner as fully explained in the patent above referred to. Stated briefly, the action of the lever 20 on the beveled rim of the flange 22 forces the pulley 5 toward the clutch-member 15 and the spring-arms 23, fastened to the web of the pulley at 24, are formed with inwardly bent ends 25 which engage with beveled faces 26 at the end of the bushing 9 to continue the movement of the pulley 5 and force its clutch-face 12 into engagement with the face 14.

To disengage the pulley 5 from the member 15 the lever 21 is carried against the opposite beveled face of the flange 22 to slide the pulley in the reverse direction, whereupon the ends of the spring-arms 23 ride up over the beveled faces 26 and seat on the shoulders 27 to continue the movement of the pulley to release its flange from the lever.

The operating or controlling-levers 20 and 21 for the clutch are mounted on a rockable shaft 30 and may be conveniently constructed as one element made integral with a single hub 31, see Figs. 1 and 2. The rock-shaft 30 may be mounted in bearings 32 on the frame of the machine and the hub 31 of the levers 20 and 21 is secured to its end by suitable means such as a set-screw 33. At the opposite end of the shaft 30 is a lever or handle 34 for use in manually rocking the levers 20 and 21, and to provide for their automatic operation a spring 35, anchored to a fixed part of the machine, is connected to a hook 36 on the lever 21, see Fig. 2.

The above described arrangement of the essential elements of the clutch-device is substantially the same as that in the patent hereinbefore referred to and the present invention contemplates certain improvements in the form and construction of the clutch-controlling means, as next described. It has been explained that the operating-levers 20 and 21 engage with the oppositely beveled rim of the flange 22 on the pulley 5 to shift the latter into and out of engagement with the clutch-member 15, the ends of said levers having rounded or beveled faces for this purpose. In winding and other automatic machines frequent starting and stopping is necessary during the progress of the work so that the levers 20 and 21 are subjected to heavy duty in wedging one clutch-member toward and away from the other member, and the repeated engagement of the levers with the flange 22 entails considerable wear on the contacting surfaces. It has been found, therefore, that the ends of the levers and the beveled faces of the flange soon wear down to such an extent that the levers will not act to shift the clutch-member the required distance to insure proper coaction of the clutching faces. When this occurs the parts must be discarded and replaced with new ones and this entails loss of use of the machine and considerable expense for repair parts. It is true, of course, that in the present preferred type of clutch-device, as set forth in the patent hereinbefore referred to, a proportion of the wear is eliminated due to the provision of the spring-arms 23 which continue the movement of the pulley 5 to remove its flange 22 away from the levers 20 and 21 so that it will turn free thereof. Even with this provision, however, the frequent engagement of the levers with the flange results in excessive wear and the present improvement is designed to reduce the wear on the parts to a minimum. The means and method for accomplishing this result are as follows:

Referring to Figs. 1, 3 and 4, the present improvement consists essentially in so constructing the flange 22 that the levers 20 and 21 will be relieved to a considerable extent of the wearing thrust against the sides of the flange. For this purpose the flange 22 is formed with "high" and "low" points on its opposite faces, or more or less like the contour of a cam. Fig. 4 is a development of the rim or periphery of the flange 22 and as here shown the sides of the flange are undulating, with convexed and concaved sections disposed in alternate relation on its opposite sides. Fig. 3 illustrates the flange 22 in section on an axial plane, the full lines showing a portion of the flange in relation to its offset part, indicated by the dotted lines. The purpose of this peculiar construction of the flange 22 is to provide clearance spaces for the ends of the levers 20 and 21 when the latter are carried into position to act on the flange. Through this arrangement the levers are permitted to be carried into operative position without frictional thrust on the sides of the flange, but as the latter rotates its "high" points will engage with the ends of the levers to cause the wedging action which shifts the pulley 5 toward or away from the opposite clutch-member 15. The method of operation of the complete device is as next explained:

Fig. 1 shows the pulley 5 released from the clutch-member 15 and free to rotate as an "idler" without driving the shaft 6. With the clutch-members in this relation the lever 20 will be raised to inoperative position and the lever 21 depressed as illustrated in Fig. 2. To start the machine or other apparatus with which the clutch-device is connected the handle 34 is rocked in the direction indicated by the arrow $x$, Fig. 2, against the force of the spring 35. This action depresses the lever 20 to bring its beveled end into position to wedge against the side of the flange 22 on the pulley 5 to shift the latter to the right, as viewed in Fig. 1. It will be understood, of course, that the pulley 5 is driven continuously from its belt or other transmission means, not herein shown, and consequently the "high" and "low" points on the side of the flange 22 have a constantly varying relation to the end of the lever 20. It will be observed from Fig. 4 that there are two "high" points 40 on the side of the flange 22 with which the lever 20 engages and that the remainder of the face of the pulley is dished away from said lever. This provides that a certain proportion of the rim of the flange 22 will have a clearance between its side and the end of the lever 20 even when the latter is depressed into operative relation with the flange. Stated another way, when the lever 20 is depressed it will clear the side of the flange 22 where the latter is offset away from its end, and will only engage directly with the flange when the "high" point thereof comes into position opposite the end of the lever. It has been demonstrated in practice that in throwing the lever 20 into operative position it will clear the flange 22 on its downward stroke the greater proportion of the time, making immediate engagement therewith only when one of the "high" points 40 in the flange happens to be exactly in position opposite the lever. Immediately the lever 20 has reached its down position, however, one of the "high" points on the flange will rotate into engagement with its end and will then act with a wedging effect to force the pulley 5 to the right. In Fig. 4 the full lines illustrate the manner in which the lever 20 is thrown into operative position clear of the flange 22, and the dotted lines indicate the manner in which one of the "high" points on the cam turns into position to engage the lever to force the clutch in an axial direction. It has before been explained that this wedging or prying action between the lever 20 and the flange 22 causes the pulley 5 to be shifted to a slight extent only, or until the ends 25 of the spring-arms 23 are carried over onto the beveled faces 26 of the bushing 9, whereupon the tension of said arms will act to slide the pulley the remaining distance to engage its clutch-face 12 with the face 14 on the clutch-member 15. Under this action the clutch-faces will be forced into engagement by the spring tension of the arms 23 and meanwhile the pulley 5 will have been moved to such an extent that its flange 22 is freed from contact with the lever 20 so that as the pulley 5 continues to rotate the engaging face of the lever and the rim of the flange are relieved of all friction and wear.

A suitable detent-means is usually employed for holding the lever 20 in depressed position against the tension of the spring 35, and in most instances automatically-operated mechanism is employed to release the detent-means to effect the stopping of the machine. Upon release of the detent-means the spring 35 acts to rock the shaft 30 to raise the lever 20 and concurrently depress the lever 21 and this action serves to disengage the clutch-members 5 and 15 in substantially the same manner as that in which they are engaged. That is to say, the lever 21 is carried down past the periphery of the flange 22, and usually at a point where the rim clears the end of the lever, but immediately thereafter the flange rotates into such position that one of its "high" points will wedge against the side of the lever 21 to force the pulley 5 to the left, as viewed in Fig. 1. This action releases the clutch-face 12 from the face 14 and the initial movement of the pulley 5 causes the ends of the spring-arms 23 to ride up onto the shoulders 27 on the bushing 9. The raising of the ends of the spring-arms 23 causes them to flex, whereby their inherent spring tension tends to straighten them again and in this manner the pulley 5 is caused to be shifted to the left to a further extent to remove the flange 22 from contact with the end of the lever 21, in the manner and for the purpose as before explained. It will be understood that the levers 20 and 21 are located very accurately in relation to the sides of the flange 22 with which their operating faces engage; the end of the lever 20 being so positioned that when the pulley 5 is engaged with the clutch-member 15 there will be a slight clearance between the operating face of the lever and the "high" points on the flange 22; and likewise when the pulley 5 is rotating free of the clutch-member 15 the "high" points on the opposite side of the flange will pass clear of the lever 21.

It will be observed from the foregoing description that my improved clutch-controlling device operates in such manner as to relieve the engaging faces of the clutch-shifting means from fifty per cent or more of the wear usually entailed thereby. Furthermore, by providing that the rotative motion of one of the clutch elements itself shall furnish the force for sliding the shiftable member a much smoother and easier action is accomplished while also insuring a more positive control of the clutch to prevent sluggishness or drag in its action.

While I have herein illustrated and described a preferred construction of the invention as embodied in a certain type of clutch, it is obvious that modifications may be made in the structure or arrangement of the parts of the device, or in its mode of application to use, without departing from the spirit or scope of the invention. Therefore, without limiting myself in this respect, I claim:

1. In a clutch-device, the combination with clutch-members adapted to be engaged to effect driving action, of means for engaging and disengaging said members comprising a shiftable element having an annular beveled face provided with an undulating cam-surface on its side, and means movable to engage the beveled face with a wedging action to shift the element, said means adapted to normally clear the "low" points on the cam-surface but to be engaged by the "high" points thereof during the rotation of said element to effect the shifting action.

2. In a clutch-device, the combination of engageable clutch-members, means for operating the same to engage and release the clutching-faces comprising an element provided with an annular beveled flange formed with a cam-face on its side having "high" and "low" points, and operating means for the clutch shiftable into position to normally clear the "low" points on the cam-face but adapted to be engaged with the "high" points by the rotation of said element to shift the latter and also adapted to act with a wedging effect on the flange to shift the element whenever it engages initially with a "high" point on the cam-face.

3. In a clutch-device, the combination of a pair of clutch-members with one member adapted to be shifted in relation to the other to effect clutching action, the shiftable member being provided with an annular beveled flange having an undulating cam-face on its side, and means movable into position to normally clear the "low" points on the cam but to be engaged by its "high" points to shift the shiftable member, said movable means also adapted to act with a wedging effect on the flange of the shiftable member when it engages initially with a "high" point on the cam.

4. The combination of a pair of rotatable clutch-members adapted to be shifted one in relation to the other to effect clutching action, one of said members being provided with an annular beveled portion having an undulating cam-face, and a lever adapted to be thrown into position to normally clear the offset portions of said cam-face but engageable with the "high" points thereon whereby to act to shift the clutch-member with a wedging action either when engaged initially with a "high" point on the cam or when such engagement is effected by the rotation of the clutch-member.

5. The combination with a rotatable clutch-member, of a second member rotatable on the same axis and shiftable into and out from engagement with the first member, said shiftable member provided with an annular flange having undulating cam-faces on its opposite sides, and means shiftable into position opposite said cam-faces and arranged to clear the depressions thereof but to be engaged by the raised portions thereon to shift said clutch-member in one direction or the other.

6. The combination with a rotatable clutch-member, of a second member rotatable on the same axis and shiftable into and out from engagement with the first member, said shiftable member provided with a projecting hub having an annular flange with alternating "high" and "low" points on its opposite sides, and a pair of rockable levers adapted to be moved into position clear of the "low" points on the sides of the flange but engageable with the "high" points thereon to move the shiftable member.

7. The combination with a rotatable clutch-member, of a second member rotatable on the same axis and shiftable into and out from engagement with the first member, said second member provided with an annular flange having inclined faces on its sides, and means movable into position to normally clear the sides of the flange but adapted to be engaged with the inclined faces thereof to shift the shiftable member with a wedging action.

8. The combination with a rotatable clutch-member, of a second rotatable member adapted to be shifted axially into and out from engagement with the first member, said second member provided with an annular beveled flange having cam-faces disposed in angular relation to a plane perpendicular to the axis of rotation, and means movable into position to be engaged with said cam-faces by the rotation of said member to shift the latter axially in relation to the first member, or to engage initially with a "high" point on the cam-faces to shift the clutch-member by a direct wedging action.

9. The combination with a rotatable clutch-member, of a second rotatable member adapted to be shifted axially into and out from engagement with the first member, said second member provided with inclined cam-faces, means adapted to be shifted into position to be engaged with said cam-faces by the rotation of said member to initiate the axial shifting of the latter, and resilient means for continuing the movement of said member to relieve its cam-faces from contact with the shifting-means.

10. The combination with a rotatable clutch-member, of a second rotatable member adapted to be shifted into and out from engagement with the first member, said shiftable member being provided with beveled cam-faces, means adapted to be engaged with said cam-faces by the rotation of said member to initiate the shifting movement thereof, and auxiliary means for continuing the movement of the shiftable member to remove the cam-faces from contact with the first-named shifting-means.

In testimony whereof I affix my signature.

CARL A. BRINK.